United States Patent
Hori et al.

(10) Patent No.: US 7,382,107 B2
(45) Date of Patent: Jun. 3, 2008

(54) SHIFT RANGE SWITCHING APPARATUS (75) Inventors: Masashi Hori, Anjo (JP); Shigeru Yoshiyama, Kariya (JP); Masaaki Shinojima, Chiryu (JP); Haruki Matsuzaki, Obu (JP); Tomoyuki Kashiwagi, Chita-gun (JP); Kiyoshi Kimura, Obu (JP)

(73) Assignees: Denso Corporation, Kariya, Aichi-pref (JP); Nippon Soken, Inc., Nishi, Aichi-pref (JP)

( * ) Notice: Subject to any disclaimer, the term of this patent is extended or adjusted under 35 U.S.C. 154(b) by 101 days.

(21) Appl. No.: 11/508,197

(22) Filed: Aug. 23, 2006

(65) Prior Publication Data
US 2007/0046243 A1 Mar. 1, 2007

(30) Foreign Application Priority Data
Aug. 23, 2005 (JP) .............................. 2005-241727

(51) Int. Cl.
*H02P 7/00* (2006.01)
(52) U.S. Cl. .............. 318/630; 318/560; 318/432; 318/434; 74/409; 74/440
(58) Field of Classification Search .............. 318/630, 318/560, 432, 434; 74/409, 440
See application file for complete search history.

(56) References Cited

U.S. PATENT DOCUMENTS

| | | | |
|---|---|---|---|
| 6,857,981 B2 * | 2/2005 | Hori et al. .................. 475/149 |
| 7,075,259 B2 * | 7/2006 | Nakai et al. ................. 318/432 |
| 7,250,701 B2 * | 7/2007 | Yoshiyama et al. ....... 310/68 B |
| 2003/0098218 A1 * | 5/2003 | Syamoto .................. 192/220.4 |
| 2004/0031344 A1 * | 2/2004 | Babin et al. ............. 74/473.12 |
| 2004/0072646 A1 * | 4/2004 | Hori et al. ................... 475/149 |
| 2005/0212366 A1 * | 9/2005 | Yoshiyama et al. ....... 310/68 B |
| 2005/0215375 A1 * | 9/2005 | Kimura et al. .............. 475/149 |
| 2005/0218860 A1 * | 10/2005 | Kimura et al. .............. 318/712 |

FOREIGN PATENT DOCUMENTS

| JP | 2002-310294 | 10/2002 |
|---|---|---|
| JP | 2004-138406 | 5/2004 |

* cited by examiner

*Primary Examiner*—Rita Leykin
(74) *Attorney, Agent, or Firm*—Nixon & Vanderhye P.C.

(57) ABSTRACT

By utilizing a mechanical backlash generated between an electric actuator and a shift range switching mechanism, a specific region is obtained, in which a variation in the output shaft angle is relatively small with respect to a variation in rotor angle. In this specific range, an actual shift range position is calculated, whereby the rotor angle that the motor controller recognizes is corrected so as to relate the actual shift range position. A deviation between the rotor angle and the actual shift range is corrected, so that the shift range switching is precisely performed.

8 Claims, 5 Drawing Sheets

SHIFT RANGE SWITCHING APPARATUS

CROSS REFERENCE TO RELATED APPLICATIONS

This application is based on Japanese Patent Applications No. 2005-241727 filed on Aug. 23, 2005, the disclosure of which is incorporated herein by reference.

FIELD OF THE INVENTION

The present invention relates to a shift range switching apparatus that switches shift range of an automatic transmission by use of an electric actuator. The sift range switching apparatus is provide with a detent mechanism that holds a shift range position of the automatic transmission.

A shift range position of the shit range switching mechanism is referred to as an actual shift range position, a shift range position of the electric actuator is referred to as a output shift range position, a shift range position which a electric motor controller recognizes is referred to as a recognized shift range position, and a shift range command value which is applied to the electric motor controller is referred to as a set shift range position, hereinafter.

BACKGROUND OF THE INVENTION

JP-2002-310294A shows an electric driven shift range switching apparatus. In this shift range switching apparatus, an electric actuator is comprised of an electric motor and a reduction gear. An output shaft of the electric actuator is connected to a control rod of a shift range switching mechanism. The electric motor is energized to rotate the control rod to switch an actual shift range. A motor controller controls a rotation of the electric motor. The driving force of the motor is transferred from the output shaft to the control rod in order to change the actual shift range position. When the set shift range position is changed by use of a shift range set means (a manual set means), the motor controller controls the electric motor in such a manner that the recognized shift range position is consistent with the set shift range position so that the actual shift range position is switched.

The electric driven shift range switching apparatus is designed so that the shift range set means is not mechanically connected to the shift range switching mechanism and an operation (movement) of the electric actuator corresponds to an operation (movement) of the shift range switching mechanism. Specifically, it is designed that the rotor angle of the motor that the motor controller recognizes corresponds to the actual shift range position, or the output shaft angle that the motor controller recognizes corresponds to the actual shift range position.

However, since the electric actuator and the shift range switching mechanism have mechanical portions, the rotor angle (or output shaft angle) and the actual shift range may be not consistent with each other perfectly due to manufacturing errors and the like, which may cause a deviation therebetween. This deviation may deteriorate an accuracy of control of the shift range switching mechanism with the electric actuator.

SUMMARY OF THE INVENTION

The present invention is made in view of the foregoing matter and it is an object of the present invention to provide a shift range switching apparatus capable of controlling the shift range mechanism with the electric actuator even if a deviation is generated between the rotor angle of the motor and the actual shift range position of the shift range switching mechanism.

A shift range switching apparatus of the present invention, an electric motor control means controls the electric motor so as to switch the actual shift range position that the shift range switching mechanism establishes. The electric motor control means includes a recognized position correcting means which corrects a rotation angle of a rotor or a rotation angle of an output shaft so as to correspond to the actual shift range position. This correction is conducted based on a first range in which a variation in output shaft angle is relatively small with respect to a variation in a rotor angle or a second range in which a variation in the rotor angle is relatively large with respect to a variation in the output shaft angle. The electric motor is controlled based on an operation result of the recognized position correcting means.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Embodiments of the present invention will be described hereinafter with reference to the drawings.

First Embodiment (Description of Shift Range Changing Device)

Figure 2:
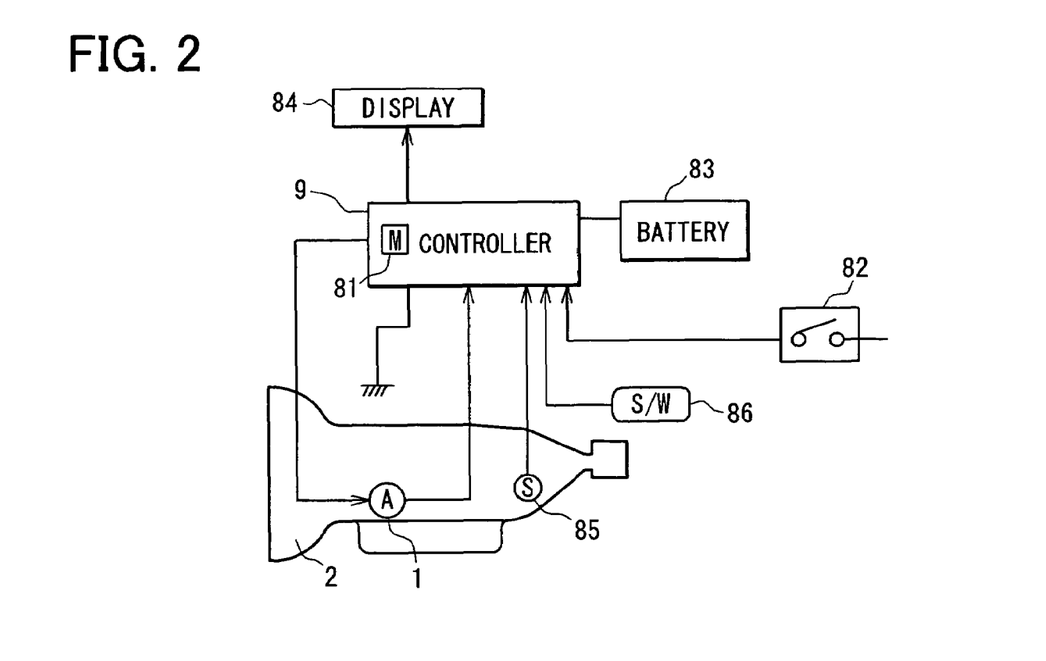
FIG. 2 is a schematic view showing a shift range switching apparatus according to the first embodiment.
Figure 3:
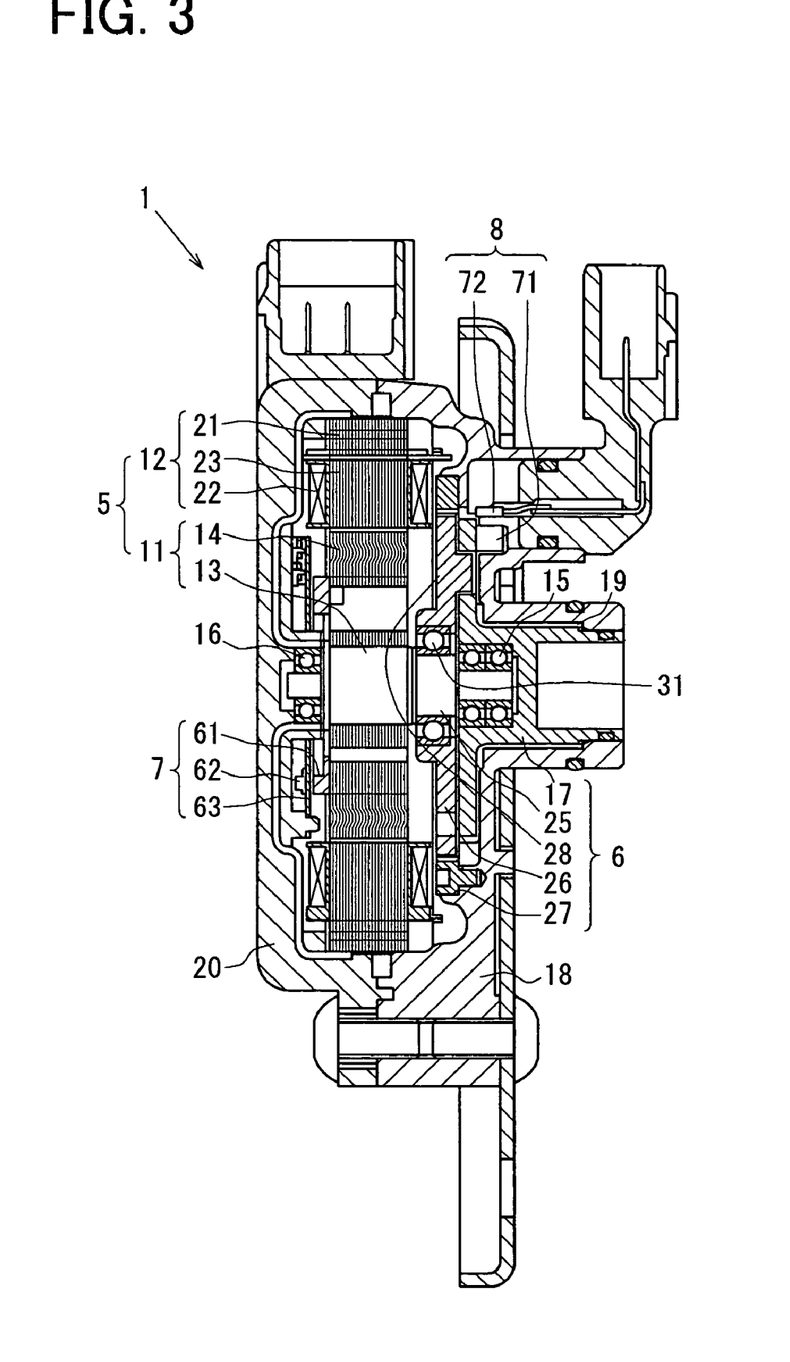
FIG. 3 is a cross sectional view of an electric actuator according to the first embodiment.
Figure 4:
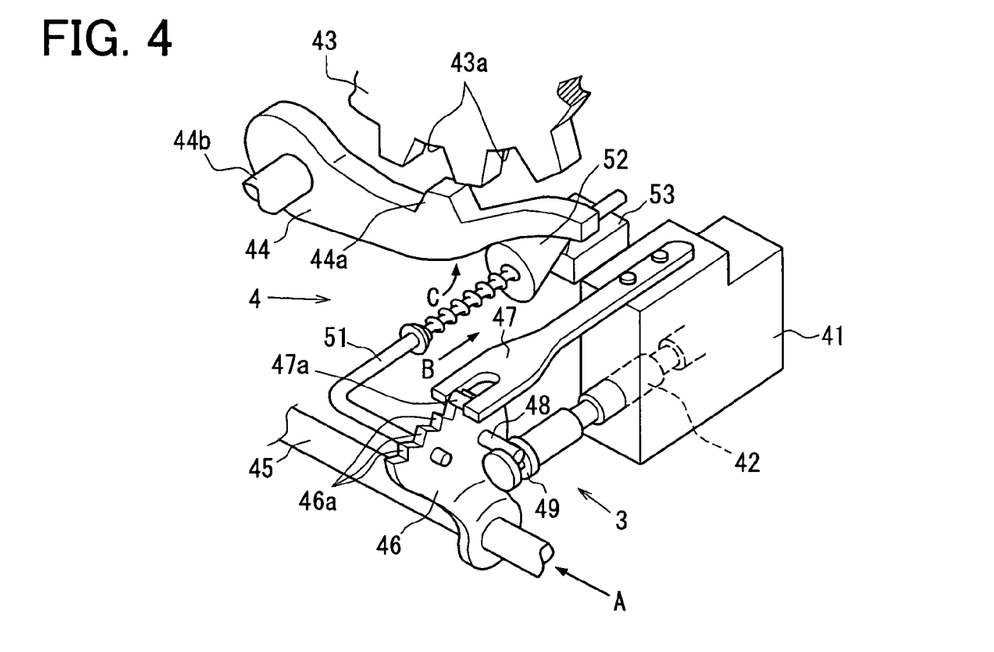
FIG. 4 is a perspective view of a shift range switching mechanism including a parking switching mechanism, according to the first embodiment.

Referring to FIGS. 2-4, a shift range switching device switches the actual shift range position of a shift range switching mechanism 3 (including a parking mechanism 4 shown in FIG. 4) by use of an electrically operated actuator 1.

The electrically operated actuator 1 is a servo mechanism for driving the shift-range-switching mechanism 3 and includes a synchronous electric motor 5, a reduction gear 6 for reducing the rotational output of this electric motor 5 to drive the shift-range-switching mechanism 3, a rotor angle detecting means 7 for detecting the rotational angle of the electric motor 5, and output angle detecting means 8 for detecting the output angle of the reduction gear 6, which corresponds to the actual shift range position. An electric motor controlling means 9 controls rotation direction, rotation speed, rotation amount, and rotation angle of the electric motor 5 through the reduction gear 6.

In FIG. 3, a right portion is referred to as a front portion, and a left portion is referred to as a rear portion hereinafter.

(Description of Electric Motor 5)

The electric motor 5 of this first embodiment is a blushless SR motor (switched reluctance motor) not using a permanent magnet and a rotatably supported rotor 11 and a stator 12 arranged coaxially with the rotational center of this rotor 11.

The rotor 11 is constructed of a rotor shaft 13 and a rotor core 14, and the rotor shaft 13 is rotatably supported by roller bearings (front roller bearing 15 and rear roller bearing 16) arranged at the front end and rear end of the rotor shaft 13.

The front roller bearing 15 is fitted in and fixed to the inside periphery of the output shaft 17 of the reduction gear 6 and the output shaft 17 of the reduction gear 6 is rotatably supported by a metal bearing 19 arranged on the inside periphery of a front housing 18. In other words, the front end of the rotor shaft 13 is rotatably supported via the metal bearing 19 provided in the housing 18, the output shaft 17, and the front roller bearing 15.

The rear roller bearing 16 is pressed onto and fixed to the rear outside periphery of the rotor shaft 13 and is supported by a rear housing 20. A housing of the electric actuator is comprised of the front housing 18 and the rear housing 20.

The stator 12 is constructed of a fixed stator core 21 and a plurality of exciting coils 22 of different phases for generating magnetic forces when energized. This stator core 21 is provided with stator teeth 23 (electrodes protruding inward) formed at intervals of 30 degrees in a manner protruding toward an inside rotor core 14. The coils 22 are wound around the stator teeth 23.

The rotor core 14 is formed by laminating multiple thin plates, and is pressed onto and fixed to the rotor shaft 13. This rotor core 14 has rotor teeth (outward protrusions) protruding toward the stator core 21 of the outside periphery at intervals of 45 degrees. Then, by sequentially switching positions and directions in which the respective exciting coils 22 of the U phase, the V phase, and the W phase are energized, the stator teeth 23 magnetically attracting the rotor stator 24 are switched in sequence to rotate the rotor 11 in one direction or in the other direction.

(Description of Reduction Gear 6)

The reduction gear 6 in this first embodiment is an internally engaged planetary gear reducer (cycloid reducer), which is a kind of planetary gear reducer, and includes a sun gear 26 (inner gear: external gear) mounted in such a way as to be able to eccentrically rotate with respect to a rotor shaft 13 via an eccentric part 25 provided in the rotor shaft 13, a ring gear 27 (outer gear: internal gear) with which this sun gear 26 is internally engaged, and transmission means 28 for transmitting only the rotating component of the sun gear 26 to the output shaft 17.

The eccentric portion 25 is a shaft that eccentrically rotates with respect to the rotary center of the rotor shaft 13 to rotate the sun gear 26 in an oscillatory manner and rotatably supports the sun gear 26 via a sun gear bearing 31 arranged on the outside periphery of the eccentric part 25.

The sun gear 26, as described above, is rotatably supported with respect to the eccentric portion 25 of the rotor shaft 13 via the sun gear bearing 31 and is so constructed as to be rotate by the rotation of the eccentric portion 25 in a state where the sun gear 26 is pressed onto the ring gear 27. The ring gear 27 is fixed to the front housing 18.

(Description of Shift-Range-Switching Mechanism 3)

The shift-range-switching mechanism 3 and the parking switching mechanism 4 will be described with reference to FIG. 4. The shift-range-switching mechanism 3 is driven by the output shaft 17 of the above-mentioned reduction gear 6 to switch the actual shift range position.

The switching of the respective shift ranges (for example, P, R, N, D) in the automatic transmission 2 is performed by sliding and displacing a manual spool valve 42 mounted on a hydraulic controller 41 according to a shift range position to switch a hydraulic pressure supply passage to a hydraulic clutch (not shown) of the automatic transmission 2 to control the engaging state of the hydraulic clutch.

The parking switching mechanism 4 works with the shift range switching mechanism 3. When the actual shift range position is set to the parking range position (P), the output shaft of the automatic transmission 2 is mechanically locked. The locking and unlocking of the parking switching mechanism 4 is performed by engaging or disengaging the depressed portions 43*a* of a parking gear 43 with or from the protruding portion 44*a* of the parking pole 44. The parking gear 43 is coupled to the output shaft of the automatic transmission 2 via a drive shaft (not shown), a differential gear (not shown), and by regulating the rotation of the parking gear 43, the driving wheel of a vehicle is locked.

The switching of the respective shift ranges in the automatic transmission 2 and the locking and unlocking of the parking switching mechanism 4 is performed by turning a detent plate 46 fixed to a control rod 45 driven by the reduction gear 6. This detent plate 46 is nearly shaped like a fan and is fixed to the control rod 45 with a spring pin or the like (not shown). The detent plate 46 has a plurality of detent grooves 46*a* relating to the respective shift ranges and a detent spring 47 that is made of a plate spring and is provided on its tip with an engaging roller 47*a* to be fitted in any one of the detent grooves 46*a*. This detent spring 47 is fixed to the hydraulic controller 41.

The detent plate 46 is mounted with a pin 48 for driving a manual spool valve 42. The pin 48 is engaged with a groove 49 formed at the end of the manual spool valve 42. When the detent plate 46 is turned by the control rod 45, the pin 48 is driven along an arc to linearly move the manual spool valve 42 engaged with the pin 48 in the hydraulic controller 41.

When the control rod 45 is turned clockwise when viewed from the direction shown by an arrow A in FIG. 4, the pin 48 presses the manual spool valve 42 into the hydraulic valve body 41 via the detent plate 46, whereby an oil passage in the hydraulic valve body 41 is switched in order of D→N→R→P. In other words, the shift range of the automatic transmission 2 is switched in order of D→N→R→P.

When the control rod 45 is turned in an opposite direction, the pin 48 pulls the manual spool valve 42 out of the hydraulic valve body 41, whereby the oil passage in the hydraulic valve body 41 is switched in order of P→R→N→D. In other words, the shift range of the automatic transmission 2 is switched in order of P→R→N→D.

Meanwhile, the detent plate 46 is fitted with a parking rod 51 for driving a parking pole 44. A conical part 52 is fitted on the tip of this parking rod 51.

This conical part 52 is interposed between the protruding portion 53 of the housing of the automatic transmission 2 and the parking pole 44. When the control rod 45 is turned clockwise when viewed from the direction shown by the arrow A in FIG. 4 (specifically, shift range is switched from R to P), the parking rod 51 is displaced in the direction shown by an arrow B in FIG. 4 via the detent plate 46 to push up parking pole 44 by the conical part 52. Then, the parking pole 44 is turned around a shaft 44b in the direction shown by an arrow C in FIG. 4 to engage the protruding portion 44a of the parking pole 44 with the depressed portion 43a of the parking gear 43, whereby the parking switching mechanism 4 is brought into a locking state.

When the control rod 45 is rotated in a reverse direction (specifically, shift range is switched from P to R), the parking rod 51 is pulled back in a direction opposite to a direction shown by an arrow B in FIG. 4 to eliminate a force pushing up the parking pole 44. Because the parking pole 44 is always biased in a direction opposite to a direction shown by an arrow C in FIG. 4 by a torsion coil spring (not shown), the protruding portions 44a of the parking pole 44 is disengaged from the depressed portion 43a of the parking gear 43 to set the parking gear 43 free, whereby the parking switching mechanism 4 is brought into an unlocking state.

(Description of a Rotor Angle Detecting Means 7)

The electrically operated actuator 1 has the encoder 7 (rotor angle detecting means) for detecting the rotational angle of the rotor 11 mounted in its housing (front housing 18 and rear housing 20). By detecting the rotational angle of the rotor 11 by this encoder 7, the electric motor 5 can be driven at high speeds without a loss of synchronization.

The magnet 61 is nearly shaped like a ring disc and is arranged coaxially with the rotor shaft 13 and is bonded to the end surface (rear surface) in the axial direction of the rotor core 14. A surface (rear surface) opposite to the Hall IC 62 of the magnet 61 is magnetized so as to detect a rotational angle and an index to develop a magnetic force in the axial direction of the magnet 61. When the rotor 11 rotates, the Hall IC 62 generates output wave-signals according to the rotation of the rotor.

(Description of Output Shaft Angle Detecting Means 8)

The electric actuator 1 includes the output shaft angle detecting means 8 for detecting the rotational angle of the output shaft 17. The motor controller 9 detects an actual range position (P, R, N, D) actually set by the shift-range-switching mechanism 3 from the rotational angle of the output shaft 17 detected by the output angle detecting means 8.

This output angle detecting means 8 detects the rotational angle of the output shaft 17 as a continuous amount and is constructed of a magnet 71 rotating integrally with the output shaft 17 and a linear output Hall IC 72 fixed on the front housing 18.

The magnet 71 is nearly shaped like a crescent when viewed from the axial direction and is magnetized in such a way that magnetic flux crosses the linear output Hall IC 72. When the distance between the magnet 71 and the linear output Hall IC 72 changes within the rotational range of the output shaft 17 the magnetic flux density passing through the linear output Hall IC 72 changes. The output shaft angle is detected based on the magnetic flux density.

(Description of Motor Controlling Means 9)

The motor controlling means 9 will be described with reference to FIG. 2.

The motor controlling means 9 for controlling the energizing of the electric motor 5 is a microcomputer having a well-known structure constructed of a CPU for performing control processing and operation processing, storage means 81 for storing various programs and data (ROM, EEPROM, SRAM, RAM), an input circuit, an output circuit, a power supply circuit, and the like. The EEPROM can hold the stored data even if not energized. The SRAM can hold the stored data, receiving a minute electric current.

Here, a reference numeral 82 in FIG. 2 denotes a startup switch (ignition switch, accessory switch, or the like), a reference numeral 83 denotes a in-vehicle battery, a reference numeral 84 denotes display means for showing the states of a shift range and the electric actuator 1 (visual display, alarm lamp, alarm sound in a normal operation), a reference numeral 85 denotes a vehicle speed sensor, a reference numeral 86 denotes the setting switch (or detecting sensor) of manual range setting means manually operated by an occupant, a brake switch for detecting whether or not a vehicle braking device for applying a braking force to wheels is applied, and the other sensors for detecting the state of the vehicle.

When the startup switch is turned ON, the motor controller 9 is energized to execute various calculating routine. When the startup switch is turned OFF, the motor controller is deenergized.

The motor controller 9 is provided with various programs such as a rotor angle reading means, an output shaft angle reading means, and a normal control means. The rotor angle reading means reads the rotation direction, the rotation speed, the rotation amount, the rotation angle of the rotor 11 from the outputs of the rotor angle detecting means 7. The output shaft angle reading means reads the rotational angle of the output shaft 17 from the output of the output angle detecting means 8. The normal control means controls the electric motor 5 such that a set shift range position set with the shift range set means agrees with an actual range position recognized by the motor controller 9.

The normal control means is a control program for performing the following action: when there is a range difference between the set shift range position set by the shift range setting means and the recognized shift range position which the motor controller 9 recognizes, the normal control means determines the rotation direction, the rotation speed, the rotation amount, the rotation angle of the electric motor 5 on the basis of the range difference. The respective exciting coils 22 are energized to bring the set shift range position consistent with the recognized shift range position, and then the electric motor 5 is stopped.

Figure 5A:
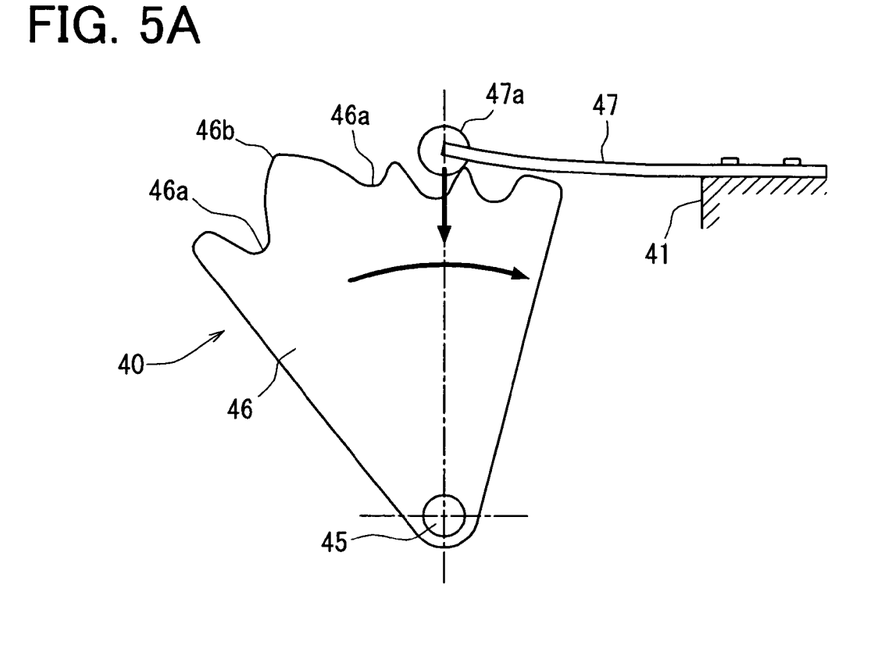
FIGS. 5A and 5B are schematic views showing a detent mechanism according to the first embodiment.
Figure 5B:
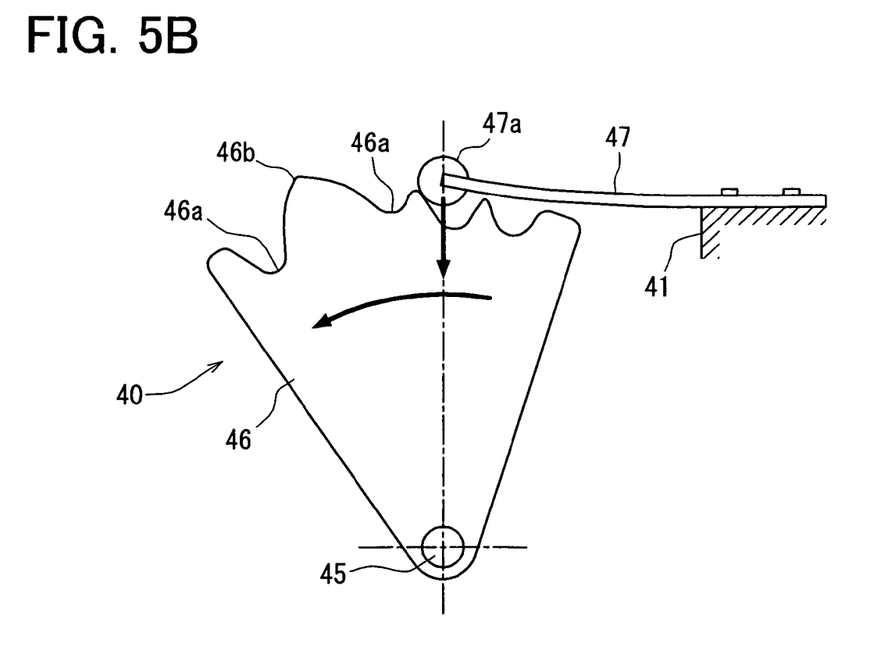

Referring to FIG. 5, the detent mechanism 40 is described hereinafter. The detent mechanism 40 is comprised of the detent plate 46 having the plurality of detent grooves 46a relating to the respective shift ranges and the detent spring 47 made of a plate spring. The detent spring 47 has an engaging roller 47a fitted in any one of the detent grooves 46a. When the engaging roller 47a at the tip of the detent spring 47 is fitted in the detent groove 46a, the present shift range position is held.

The respective detent grooves 46a is formed by a curve so as to allow the detent mechanism 40 to be released from engagement when the detent plate 46 is driven. Then, the engaging roller 47a of the detent spring 47 is so constructed as to be pressed in a direction toward the bottom of the detent grooves 46a (in a direction toward the rotational center of the detent plate 46) by the biasing force of the detent spring 47 and hence applies a mechanical force to the detent plate 46 in such a way as to move the engaging roller 47a toward the lowest bottom portion of the detent groove 46a in a state where the engaging roller 47a deviates from the lowest bottom portion of the detent groove 46a.

As shown in FIG. 5A, in a state where a position where the engaging roller 47a abuts against the detent groove 46a deviates from the lowest bottom portion of the detent groove 46a to D range side (right side in the drawing), a mechanical force for turning the detent plate 46 clockwise in the drawing is produced by the spring force of the detent spring 47.

On the contrary, as shown in FIG. 5B, in a state where a position where the engaging roller 47a abuts against the detent groove 46a deviates from the lowest bottom portions of the detent groove 46a to P range side (left side in the drawing), a mechanical force for turning the detent plate 46 counterclockwise in the drawing is produced by the spring force of the detent spring 47.

In order to hold the position of the detent plate 46 even after the electric motor 5 is stopped, a driving control stop position of the actuator 1 must be consistent with a detent stable position in which the detent mechanism 40 is stable. That is, the motor controller 9 is required to control the rotation amount and the rotation angle of the electric motor 5 precisely.

Figure 1:
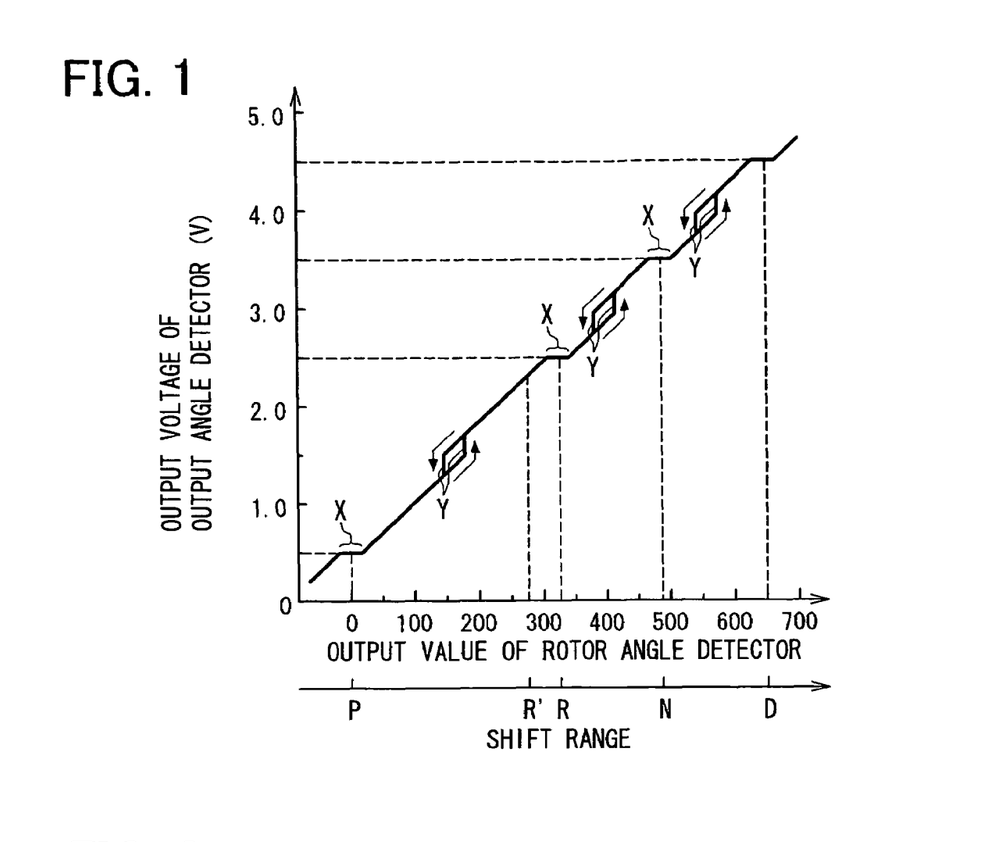
FIG. 1 is a graph showing a relationship between a rotor angle detected by a rotor angle detecting means and an output shaft angle detected by an output shaft angle detecting means, according to a first embodiment.

Referring to FIG. 1, a process the normal control means executes will be described hereinafter. When the set shift range position is changed from the P-range to R-range, the recognized shit range position is still the P-range in which the rotor angle, which is represented by a count amount by the Hall IC 62 of the rotor angle detecting means 7, is zero and the output shaft angle, which is represented by an output voltage of a linear output Hall IC 72, is 0.5V. On the other hand, the set shift range position is R-range in which the output shaft angle is 2.5V.

The motor controller 9 controls the electric motor 5 so that the recognized sift range position is changed from a position in which the rotor angle is zero and the output shaft angle is 0.5V to a position corresponding to the R-range in which the rotor angle is 325 and the output shaft angle is 2.5V. When the rotor angle reaches 325 and the output shaft angle reaches 2.5V, the motor is deenergized.

In other word, when the actual shift range position is changed from P-range to the R-range, the motor controller 9 controls the electric motor 5 so that the rotor angle is changed from zero to 325.

The electrically driven shift range switching apparatus is designed so that the movement of the electric actuator 1 correctly corresponds to a movement of the shift range switching mechanism 3. That is, the rotor angle that the motor controller 9 recognizes corresponds to the actual shift range position (the detent stable position), or the output shaft angle that the motor controller 9 recognizes corresponds to the actual shift range position.

However, the electric actuator 1 and the shift range switching mechanism 3 have backlash due to manufacturing error. Hence, it is possible that the rotor angle that the motor controller 9 recognizes is not consistent with the actual shift range position perfectly. The rotor angle may deviate from the actual shift range position, which may cause oscillating movement of the detent plate 46 after the electric motor 5 is deenergized.

Referring to FIG. 1, one embodiment in the R-range is described hereinafter.

In a case that no deviation exists between the actuator 1 and the shift rage switching mechanism 3, the detent stable position is the R-range in FIG. 1. The motor controller 9 recognizes that the recognized shift range position is the R-range in which the rotor angle is 325 and the output shaft angle is 2.5V. The stop position of the actuator 1 is perfectly consistent with the detent stable position where the detent mechanism 40 is stable. Hence, the detent plate 46 does not make the oscillating movement after the electric motor 5 is deenergized.

In a case that a deviation exists between the actuator 1 and the shift rage switching mechanism 3, the detent stable position is a R'-range and the recognized shift range position is the R-range in which the rotor angle is 325 and the output shaft angle is 2.5V. That is, the stop position of the actuator 1 is not consistent with the detent stable position. In this case, the detent plate 46 may make the oscillating movement after the electric motor 5 is deenergized.

According to the first embodiment, when a deviation exists between the rotor angle that the motor controller 9 recognizes and the actual shift range position of the shift range position changing mechanism 3, the deviation is self-corrected by utilizing a mechanical backlash in a power transmission system including the actuator 1, the output shaft 17, and the control rod 45.

The self-correction will be described hereinafter.

The mechanical backlash exists in the power transmitting system from the output shaft 17 to the detent plate 46. Specifically, the mechanical backlash is provided between the output shaft 17 and the detent plate 46 in order to avoid a mechanical seizing during operation thereof and in order to smoothly install the actuator 1 in the shift range switching mechanism 3. The output shaft 17 and the control rod 45 are connected to each other through a spline, which generates a mechanical backlash in rotation direction. The reduction gear 6 also has a mechanical backlash.

Since the engaging roller 47a of the detent spring 47 is so constructed as to be pressed in a direction toward the bottom of the detent grooves 46a by the biasing force of the detent spring 47, the mechanical backlash will be generated before and after the engaging roller 47a is engaged with the detent groove 46a. In a situation where the engaging roller 47a is engaged with the detent groove 46a, when the rotor 11 is rotated in a normal or reverse direction, the detent plate 46 does not move. The rotor 11 rotates a little amount, which corresponds to the mechanical backlash. That is, in a range where the output shaft angle variation is relatively small with respect to the variation in rotor angle, the detent stable position corresponding to the actual shift range exists. The range where the variation in output shaft angle is relatively small with respect to the variation in rotor angle is referred to as a small range X.

Based on the range of the rotor angle in the small range X, the mechanical backlash amount is obtained, which is generated in a system including the rotor 11, the control rod 45, and the detent plate 46.

The motor controller 9 calculates the mechanical backlash and obtains the detent stable position for each actual shift range position. The motor controller 9 is provided with a recognized position correction means, which corrects the rotor angle that the motor controller 9 recognizes to the actual shift range position based on the small range X. The electric motor 5 is controlled based on the rotor angle and the detent stable position which are corrected by the recognized position correction means.

The recognized position correction means is described hereinafter.

The recognized position correction means is comprised of a backlash amount calculating means and a backlash considering means. The backlash amount calculating means calculates the mechanical backlash between the rotor 11 and the detent plate 46 based on the rotor angle range in the small range X. The backlash considering means makes the rotor angle correspond to the actual shift range position based on the backlash amount.

As shown in FIG. 5A, in a state where a position where the engaging roller 47a abuts against the detent groove 46a deviates from the lowest bottom portion of the detent groove 46a to D range side (right side in the drawing), a mechanical force for turning the detent plate 46 clockwise in the drawing is produced by the spring force of the detent spring 47. Thus, the output shaft 17 is linked to the detent plate 46 at one side end of the backlash range (The backlash is reduced in a normal direction).

On the contrary, as shown in FIG. 5B, in a state where a position where the engaging roller 47a abuts against the detent groove 46a deviates from the lowest bottom portions of the detent groove 46a to P range side (left side in the drawing), a mechanical force for turning the detent plate 46 counterclockwise in the drawing is produced by the spring force of the detent spring 47. Thus, the output shaft 17 is linked to the detent plate 46 at the other side end of the backlash range (The backlash is reduced in a reverse direction).

The detent plate 46 is positioned at a position where the engaging roller 47a engages with the bottom portion of the detent groove 46a. Even when the detent plate 46 is hold, the output shaft 17 can rotate in the backlash amount. That is, when the engaging roller 47a engages with the bottom portion of the detent groove 46a, the rotor angle detected by the rotor angle detecting means 7 varies by the backlash amount even if the output shaft angle detected by the output shaft angle detecting means 8 does not change, as shown in FIG. 1.

The backlash amount calculating means calculates the rotor angle range in which a ratio between an output gain of the output shaft angle detecting means 8 and an increased/decreased amount of the rotor angle is less than a predetermined value. This rotor angle range is established as the backlash amount. When the backlash amount between the output shaft 17 and the detent plate 46 is obtained, "the backlash amount"="the rotor angle range in the small range X"×"the reduction ratio K of the reduction gear 6".

The timing in which the backlash amount is calculated is established appropriately. For example, when the backlash amount is not stored in the memory means 81, when a predetermined period has passed, or every when the motor controller 9 is energized, the backlash amount is calculated.

The backlash considering means recognizes the average of the backlash amount in the small range X as the actual shift range position, or recognizes a predetermined ratio of the backlash amount in the small range X as the actual shift range position.

When the backlash amount exceeds a predetermined value, a warning means 84 indicates that a malfunction is occurred, whereby a passenger is notified that the malfunction is occurred.

The recognized position correcting means can be modified. That is, the recognized position correcting means can make the rotor angle correspond to the actual shit range position based on an average continuous line of an upper value line and a lower value line of a variation in output shaft angle.

When the detent stable position deviates from the rotor angle (designed value), the average continuous line (actual value) also deviates from the pre-designed average continuous line. Based on the deviation amount of the actual averaged line from the pre-designed average line, the rotor angle is corrected to correspond to the actual shift range position (the detent stable position).

The motor controller 9 includes a storing means which stores the rotor angle in the memory means 81. The rotor angle corresponding to the actual shift range position can be updated or averaged by use of a well-known learning method. The memory means 81 is the EEPROM or SRAM.

The motor controller 9 controls the electric motor 5 to switch the shift range position according to the data stored in the memory means 81. Referring to FIG. 1, one embodiment is described hereinafter.

When the rotor angle of R-range is 325 and the actual shift range is R'-range, the rotor angle is corrected to 275. This corrected rotor angle is stored in the memory means 81. When the set shift range position is changed to R-range, the motor controller 9 controls the electric motor 5 is such a manner the rotor angle becomes 275. Thereby, the actual shift range (detent stable position is R') is consistent with the rotor angle at 275, so that the detent plate 46 does not make the oscillating movement after the electric motor 5 is deenergized.

According to the first embodiment, the small range X in which the variation in output shaft angle is relatively small is obtained by utilizing the mechanical backlash in the power transmission system from the actuator 1 to the control rod 45. Based on this small range X, the motor controller 9 makes the rotor angle correspond to the actual shift range position.

Hence, even if a deviation is generated between the rotor angle and the actual shift rage position, the rotor angle that the motor controller 9 recognizes is corrected to correspond the actual shift range position, so that the shift range switching mechanism 3 is correctly controlled by the electric motor 1.

Second Embodiment

According to a second embodiment, the recognized position correcting means corrects the output shaft angle which the motor controller 9 recognizes so as to correspond to the actual shift range position based on the small range X in which the variation in output shaft angle is relatively small with respect to the variation in rotor angle. Thereby, even if a deviation is generated between the output shaft angle and the actual shift range position due to the mechanical backlash of the actuator 1 and the shift range switching mechanism 3, the output shaft angle can be corrected so as to correspond to the actual shift range position. The detection accuracy of the actual shift range position based on the output shaft angle is enhanced. That is, an analog output characteristic of the output shaft angle detecting means 8 is changed due to a variation in magnetic force of the magnet 71, the output shaft angle is correctly detected.

Third Embodiment

Figure 6:
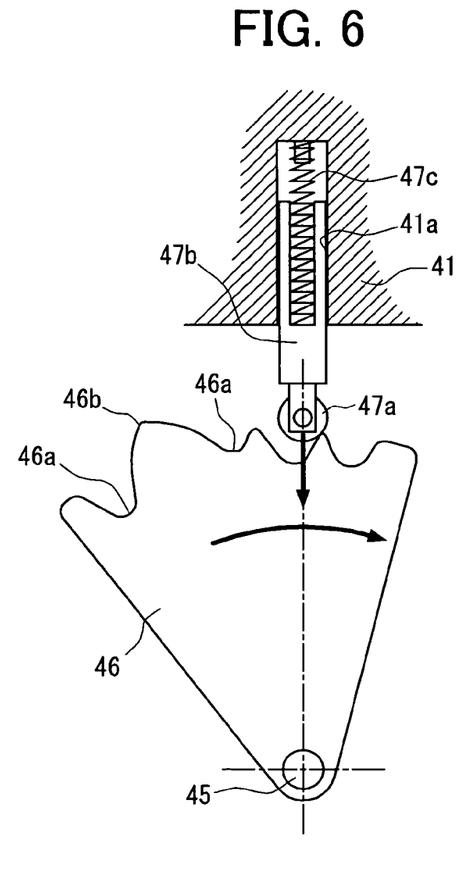
FIG. 6 is a schematic view showing a detent mechanism according to a third embodiment.
Figure 7:
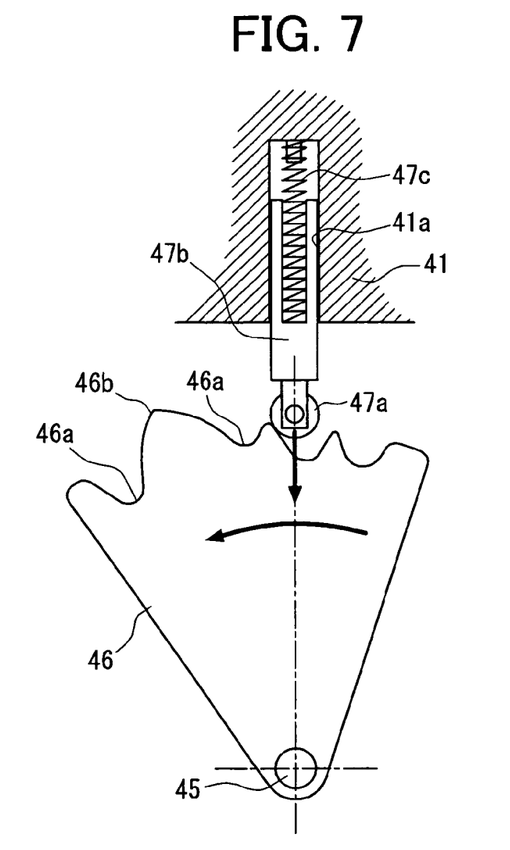
FIG. 7 is a schematic view showing the detent mechanism according to the third embodiment.

Referring to FIGS. 6 and 7, a third embodiment is described hereinafter. The detent mechanism 40 includes the detent plate 46 and an engaging means which engages with the detent grooves 46a. The engaging means includes the engaging roller 47a, a piston 47b, and a coil spring 47c. The piston 47b reciprocates in a cylinder 41a which is formed in a housing of a hydraulic controller 41. The coil spring 47c biases the piston 47b toward a rotation center of the detent plate 46, so that the engaging roller 47a is biased to the bottom of the detent groove 46a. The detent mechanism 40 has the same function as the first embodiment.

(Modification)

In the first embodiment, the backlash amount is obtained in the small range X in which a variation in rotor angle is relatively large with respect to the variation in output shaft angle.

Figure 8:
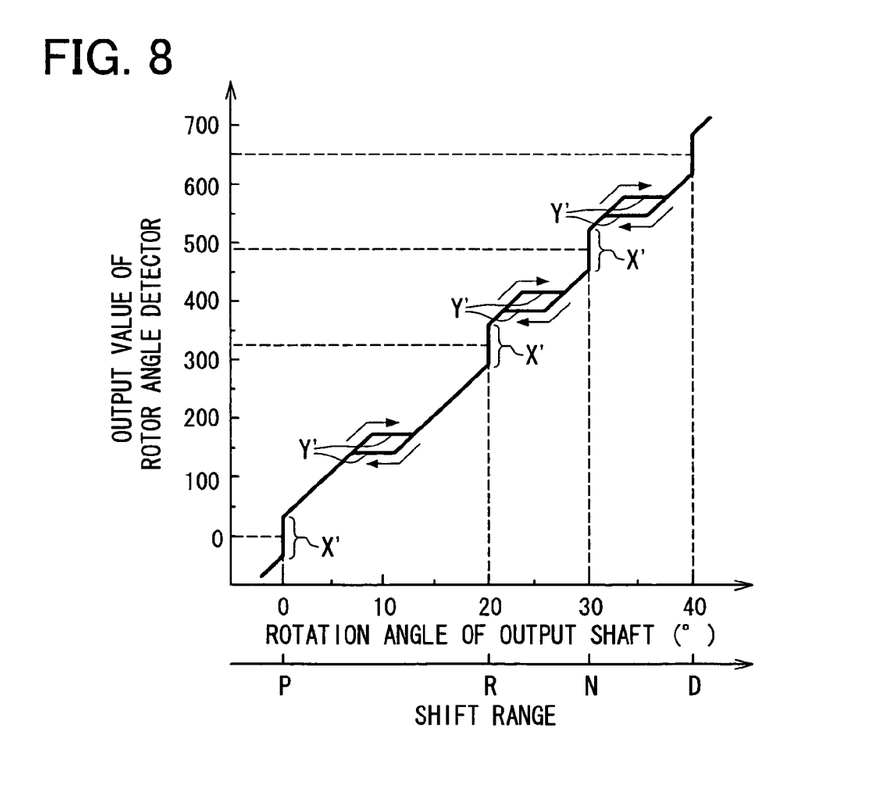
FIG. 8 is a graph showing a relationship between an output shaft angle detected by the output shaft angle detecting means and a rotor angle detected by the rotor angle detecting means.

According to a modification, as shown in FIG. 8, the mechanical backlash can be obtained based on a large range X in which the rotor angle changes in large amount with respect to the variation in the output shaft angle. The actual shift range position relating to the rotor angle or the output shaft angle can be obtained.

Alternatively, as shown in FIG. 1, the mechanical backlash can be obtained in the large region Y in which the variation in output shaft angle is relatively large with respect to the variation in rotor angle. The variation in output shaft angle corresponds to a mechanical backlash which is generated when the engaging roller 47*a* overrides a top portion 46*b* of the detent plate 46. The rotor angle or the output shaft angle relating to the actual shift range position can be obtained based on the mechanical backlash.

Alternatively, as shown in FIG. 8, the mechanical backlash can be obtained in a small region Y in which the variation in rotor angle is relatively small with respect to the variation in the output shaft angle. The variation in rotor angle corresponds to a mechanical backlash which is generated when the engaging roller 47*a* overrides a top portion 46*b* of the detent plate 46. The rotor angle or the output shaft angle relating to the actual shift range position can be obtained based on the mechanical backlash.

Alternatively, the mechanical backlash can be obtained in the large region in which the variation in output shaft angle is relatively large with respect to the variation in rotor angle. The actual shift range position relating to the rotor angle or the output shaft angle can be obtained based on the mechanical backlash. Alternatively, the mechanical backlash can be obtained in both the small region X and the large region Y. The actual shift range position relating to the rotor angle or the output shaft angle can be obtained based on the mechanical backlash.

In the above embodiments, the rotor angle detecting means 7 is used. Instead of the rotor angle detecting means 7, the motor controller 9 may counts the number of times the coil 22 are energized to obtain the rotor angle.

In the above embodiments, the SR motor is used as the electric motor 5. A reluctance motor such as a synchronous reluctance motor, an interior permanent magnet synchronous motor (IPM), or a surface permanent magnet synchronous motor (SPM) can be used.

The reduction gear 6 can be comprised of a sun gear 26 driven by the rotor shaft 13, planetary pinions disposed around the sun gear 26 at regular intervals, and a ring gear engaging with the planetary gear.

The electric motor 5 can be directly connected to the output shaft 17. The output shaft angle detecting means 8 can be provided outside of the electric actuator 1 to detect the rotation angle of the control rod 45.

What is claimed is:

1. A shift range switching apparatus comprising:
    a detent mechanism provided in a shift range switching mechanism which establishes an actual shift range position corresponding to a rotation angle of a control rod, the detent mechanism mechanically holding the actual shift range position with an engaging structure using a spring force;
    an electrically driven actuator provided with an electric motor which drives an output shaft directly or via a reduction gear to rotate the control rod; and
    an electric motor control means for controlling the electric motor so as to switch the actual shift range position that the shift range switching mechanism establishes, wherein
    the electric motor control means includes a recognized position correcting means for correcting a rotation angle of a rotor that electric motor control means recognizes or a rotation angle of an output shaft that electric motor control means recognizes so as to correspond to the actual shift range position based on a first range in which a variation in output shaft angle is relatively small with respect to a variation in a rotor angle or a second range in which a variation in the rotor angle is relatively large with respect to a variation in the output shaft angle, and
    the electric motor is controlled based on an operation result of the recognized position correcting means.

2. The shift range switching apparatus according to claim 1, wherein
    the recognized position correcting means includes:
    a backlash amount calculating means for calculating a mechanical backlash which is generated between the rotor and the control rod based on a range of rotor angle in the first range or the second range; and
    a backlash considering means for relating the rotor angle or the output shaft angle that the electric motor control means recognizes with the actual shift range position that the shift range switching mechanism recognizes based on the calculated backlash amount.

3. The shift range switching apparatus according to claim 2, wherein
    the backlash considering means relates an average of the backlash amount in the first range or the rotor angle or the output shaft angle at the average of the backlash amount in the second range with the actual shift range position of the shift range switching mechanism.

4. The shift range switching apparatus according to claim 2, wherein
    the backlash considering means relates a predetermined rate of the backlash amount in the first range or a predetermined rate of the rotor angle or the output shaft angle in the second range with the actual shift range position of the shift range switching mechanism.

5. The shift range switching apparatus according to claim 2, wherein
    the electric motor control means has a display function in which a malfunction is notified to a passenger when the backlash amount exceeds a predetermined value.

6. The shift range switching apparatus according to claim 1, wherein
    the recognized position correcting means includes a backlash considering means for relating the rotor angle or the output shaft angle that the electric motor control means recognizes with the actual shift range position by use of an average continuous line of a continuous line of an upper value of a change in the output shaft angle with respect to a change in rotor angle and a continuous line of a lower value of a change in the output shaft angle with respect to the change in rotor angle.

7. The shift range switching apparatus according to claim 1, wherein
    an operation result of the recognized position correcting means is stored in an electrically erasable programmable read-only memory (EEPROM) which can store data even when the electric motor control means is deenergized or in a static random access memory (SRAM) which can store data receiving a minute electric current after the electric motor control means is deenergized.

8. A shift range switching apparatus comprising:
a detent mechanism provided in a shift range switching mechanism which establishes an actual shift range position corresponding to a rotation angle of a control rod, the detent mechanism mechanically holding the actual shift range position;
an electrically driven actuator provided with an electric motor which drives an output shaft of the shift range switching mechanism; and
an electric motor controller controlling the electric motor so as to switch the actual shift range position that the shift range switching mechanism establishes, wherein
the electric motor controller includes a recognized position corrector correcting a rotation angle of a rotor that electric motor controller recognizes or a rotation angle of an output shaft that electric motor controller recognizes so as to correspond to the actual shift range position based on a first range in which a variation in output shaft angle smaller than a variation in a rotor angle or a second range in which a variation in the rotor angle is larger than a variation in the output shaft angle, and
the electric motor is controlled based on an operation result of the recognized position corrector.

* * * * *